(12) United States Patent
Tatsumi et al.

(10) Patent No.: US 8,064,014 B2
(45) Date of Patent: Nov. 22, 2011

(54) LIGHT REFLECTING PLATE, METHOD OF MANUFACTURING THE SAME AND LIGHT REFLECTING DEVICE

(75) Inventors: Teruyaki Tatsumi, Tokyo (JP); Youji Tamura, Tokyo (JP); Keiji Yamane, Tokyo (JP)

(73) Assignee: Toyo Kohan Co., Ltd., Tokyo (JP)

( * ) Notice: Subject to any disclaimer, the term of this patent is extended or adjusted under 35 U.S.C. 154(b) by 0 days.

(21) Appl. No.: 12/585,612

(22) Filed: Sep. 18, 2009

(65) Prior Publication Data

US 2010/0014024 A1    Jan. 21, 2010

Related U.S. Application Data

(63) Continuation of application No. PCT/JP2008/059691, filed on May 27, 2008.

(30) Foreign Application Priority Data

Jun. 8, 2007  (JP) ................................. 2007-153119
Jun. 8, 2007  (JP) ................................. 2007-153120

(51) Int. Cl.
*G02F 1/1335*    (2006.01)

(52) U.S. Cl. ........................................ 349/113; 349/67

(58) Field of Classification Search .................... 349/67
See application file for complete search history.

(56) References Cited

U.S. PATENT DOCUMENTS

| | | | | |
|---|---|---|---|---|
| 3,869,319 A | * | 3/1975 | Ishihara et al. | 428/558 |
| 4,482,209 A | * | 11/1984 | Grewal et al. | 359/883 |
| 5,361,172 A | * | 11/1994 | Schissel et al. | 359/883 |
| 6,543,903 B2 | | 4/2003 | Akimoto et al. | 359/383 |
| 6,627,307 B1 | | 9/2003 | Reichert et al. | 438/332 |
| 6,848,797 B1 | | 2/2005 | Gillich et al. | 359/883 |
| 7,316,482 B2 | | 1/2008 | Adachi et al. | 353/77 |
| 2004/0257492 A1 | * | 12/2004 | Mai et al. | 349/61 |
| 2005/0206806 A1 | * | 9/2005 | Yu | 349/64 |
| 2005/0254012 A1 | * | 11/2005 | Adachi et al. | 353/20 |

FOREIGN PATENT DOCUMENTS

| | | |
|---|---|---|
| JP | 57-75408 | 5/1982 |
| JP | 05-080211 | 4/1993 |
| JP | 06-071808 | 3/1994 |
| JP | 11-183713 | 7/1999 |
| JP | 2003-255467 | 9/2003 |

* cited by examiner

*Primary Examiner* — Wen-Ying P Chen
(74) *Attorney, Agent, or Firm* — Bacon & Thomas, PLLC

(57) ABSTRACT

The light reflecting plate has a substrate made of metal plate, a binder layer made of organic resin or an inorganic material, which is formed on the substrate, a reflective layer formed of a plated layer of silver or silver alloy containing silver as a main component, which is formed on the binder layer, and a protective layer formed on the reflective layer.

6 Claims, 5 Drawing Sheets

Fig.4

| Example or Comparative Example | Type of Metal Plate | | | Chemical Treatment | | Binder Layer | |
|---|---|---|---|---|---|---|---|
| | Type of Metal Plate | Type of Plating | Plating Amount (g/m²) | Type | Attached Amount (mg/m²) | Type (Resin) | Thickness (μm) |
| Example 1 | Steel Sheet | Zn | 20 | — | — | Acrylic Urethane | 1 |
| Example 2 | Steel Sheet | Zn | 20 | Zinc Phosphate Treatment | 1000 | Polyester | 15 |
| Example 3 | Steel Sheet | Hot-Dipped Zn - 55%Al | 150 | — | — | Polycarbonate | 5 |
| Example 4 | Steel Sheet | Zn | 20 | — | — | ABS | 5 |
| Example 5 | Steel Sheet | Zn-Co-Mo | 20 | Chromate Treatment | 40 as Cr | Acrylic Urethane | 10 |
| Example 6 | Steel Sheet | Zn | 20 | Chromate Treatment | 10 as Cr | Acrylic Urethane | 15 |
| Example 7 | Stainless Steel Seet | — | — | — | — | Polyimide | 3 |
| Example 8 | Al Plate | — | — | — | — | Urethane | 12 |
| Example 9 | Al Alloy Plate | — | — | — | — | Acrylic Urethane | 15 |
| Example 10 | Steel Sheet | Zn | 20 | — | — | Alumina | 0.1 |
| Example 11 | Steel Sheet | Zn | 20 | Zinc Phosphate Treatment | 700 | Silica | 0.2 |
| Example 12 | Steel Sheet | Hot-Dipped Zn - 55%Al | 150 | — | — | Hafnium Oxide | 1 |
| Example 13 | Steel Sheet | Zn | 20 | — | — | Titanium Oxide | 0.5 |
| Example 14 | Steel Sheet | Zn-Co-Mo | 20 | Chromate Treatment | 40 as Cr | Zirconium Oxide | 2 |
| Example 15 | Steel Sheet | Zn | 20 | Chromate Treatment | 10 as Cr | Silica 20% + Alumina 80% | 3 |
| Example 16 | Stainless Steel Seet | — | — | — | — | Silica | 0.2 |
| Example 17 | Al Plate | — | — | — | — | Alumina | 0.3 |
| Example 18 | Al Alloy Plate | — | — | — | — | Silica 20% + Alumina 80% | 0.1 |
| Comparative Example 1 | Steel Sheet | Zn | 20 | — | — | — | — |

Fig.5

| Example or Comparative Example | Thickness of Silver Layer (nm) | Protective Layer (Lower Layer) | | Protective Layer (Upper Layer) | |
|---|---|---|---|---|---|
| | | Type | Thickness (μm) | Type | Thickness (μm) |
| Example 1 | 70 | Acrylic Resin | 6 | Silica | 0.05 |
| Example 2 | 150 | Alumina | 0.03 | Aclylic Urethane Resin | 6 |
| Example 3 | 100 | Acrylic Resin | 25 | — | — |
| Example 4 | 83 | Acrylic Resin + 3% by Mass Alumina | 10 | — | — |
| Example 5 | 130 | Acrylic Urethane Resin | 6 | — | — |
| Example 6 | 70 | Alumina | 0.1 | Polyester Resin | 6 |
| Example 7 | 150 | Zirconium Oxide | 0.05 | Aclylic Urethane Resin | 8 |
| Example 8 | 120 | Acrylic Resin + 3% by Mass Silica | 15 | Aclylic Urethane Resin | 3 |
| Example 9 | 75 | Polyester | 7 | Acrylic Resin + 2% by Mass Silica | 3 |
| Example 10 | 100 | Acrylic Resin | 6 | Silica | 0.05 |
| Example 11 | 120 | Alumina | 0.03 | Acrylic Urethane Resin | 6 |
| Example 12 | 150 | Acrylic Resin | 25 | — | — |
| Example 13 | 50 | Acrylic Resin + 3% by Mass Alumina | 10 | — | — |
| Example 14 | 250 | Acrylic Urethane Resin | 6 | Silica | 0.1 |
| Example 15 | 70 | Alumina | 0.1 | Polyester Resin | 6 |
| Example 16 | 150 | Silica | 0.05 | Acrylic Urethane Resin | 8 |
| Example 17 | 120 | Acrylic Resin + 3% by Mass Silica | 15 | Acrylic Urethane Resin | 3 |
| Example 18 | 75 | Polyester Resin Film | 15 | Acrylic Resin + 2% by Mass Silica | 3 |
| Comparative Example 1 | 70 | Acrylic Resin | 40 | Silica | 0.05 |

Fig.6

| Example or Comparative Example | Characteristics Evaluation Result | | |
|---|---|---|---|
| | Reduction Rate (Wavelength: 550nm) | Gas Test | Adhesion Test |
| Example 1 | ○ | ○ | ○ |
| Example 2 | ○ | ○ | ○ |
| Example 3 | ○ | ○ | ○ |
| Example 4 | ○ | ○ | ○ |
| Example 5 | ○ | ○ | ○ |
| Example 6 | ○ | ○ | ○ |
| Example 7 | ○ | ○ | ○ |
| Example 8 | ○ | ○ | ○ |
| Example 9 | ○ | ○ | ○ |
| Example 10 | ○ | ○ | ○ |
| Example 11 | ○ | ○ | ○ |
| Example 12 | ○ | ○ | ○ |
| Example 13 | ○ | ○ | ○ |
| Example 14 | ○ | ○ | ○ |
| Example 15 | ○ | ○ | ○ |
| Example 16 | ○ | ○ | ○ |
| Example 17 | ○ | ○ | ○ |
| Example 18 | ○ | ○ | ○ |
| Comparative Example 1 | × | ○ | × |

LIGHT REFLECTING PLATE, METHOD OF MANUFACTURING THE SAME AND LIGHT REFLECTING DEVICE

CROSS-REFERENCE TO RELATED APPLICATIONS

This application is a continuation of prior International Patent Application No. PCT/JP2008/059691, filed May 27, 2008, the entire contents of which are incorporated herein by reference.

BACKGROUND OF THE INVENTION

1. Field of the Invention

The present invention relates to a light reflecting plate, a method of manufacturing the same, and a light reflecting device using a light reflecting plate, more particularly to a light reflecting plate with excellent light reflection characteristics, a method of manufacturing the same, and a light reflecting device such as a mirror duct in which a light reflecting plate is provided on the inner wall of a light guiding section and which introduces sunlight to indoor by the light reflecting plate to illuminate the indoor, an illumination fixture equipped with a light reflecting plate of a light source, a liquid crystal display device equipped with a light reflecting plate of external incident light, an edge-lighting type backlight of a liquid crystal display device equipped with the light reflecting plate, or a liquid crystal display device equipped with the edge-lighting type backlight.

2. Description of the Related Art

Conventionally, as a light reflecting plate of a light reflecting device, a glass substrate on which aluminum (Al) film is deposited by vacuum evaporation (refer to Japanese Patent Laid-open No. 2001-235798) or a stainless steel substrate or anodized aluminum substrate on which aluminum (Al) or silver (Ag) film is deposited via a base layer by vacuum evaporation, vacuum sputtering or the like (refer to Japanese Patent Laid-open No. 2001-523835, Japanese Patent Laid-open No. 2002-530803) has been used.

Meanwhile, because it is possible to save energy of the above-described light reflecting device by effective utilization of light, wider promotion of the device is desired.

However, the light reflecting plate described in the aforementioned publicly known documents has the following problems.

First, the glass substrate has problems of workability and strength.

Then, the present inventor examined using a metal plate having high strength as a substrate.

The present inventor first considered evaporating silver being a reflective layer on galvanized steel sheet by an evaporation method. However, when silver is heated for evaporation purpose, the heating temperature influences a substrate side being a body to be deposited and zinc or the like on the substrate side melts first because zinc coating on the steel sheet has lower melting temperature than silver. For this reason, there is a problem that large unevenness occurs on substrate surface or the surface degenerates. Note that the problem becomes larger when substrate heating is required in performing evaporation.

Then, by using a plating method instead of evaporation, silver film was formed on galvanized or zinc alloy plated steel sheet. However, adhesion between the silver film and the galvanized or zinc alloy plated steel sheet was poor, and peel of silver film occurred.

SUMMARY OF THE INVENTION

It is an object of the invention to provide a light reflecting plate that has a reflective layer which is secure in adhesion to the substrate, is excellent in workability and strength, and is made of inexpensive materials, a method of manufacturing the plate, and a light reflecting device of a mirror duct, an illumination fixture, a liquid crystal display device and the like manufactured using the light reflecting plate.

The first invention relates to a light reflecting plate having: a substrate formed of a metal plate, a binder layer made of organic resin or an inorganic material, which is formed on said substrate, a reflective layer formed of a plated layer of silver or silver alloy having silver as a main component, which is formed on said binder layer, and a protective layer formed on said reflective layer.

Note that the light reflecting plate includes both a material before working and one worked into specific dimensions.

The second invention relates to the light reflecting plate of the first invention, in which said metal plate is surface treated steel sheet, stainless steel plate, aluminum plate or aluminum alloy plate;

the third invention relates to the light reflecting plate of the second invention, in which said surface treated steel sheet has steel sheet containing iron as a main component and chromium by less than 11%;

the fourth invention relates to the light reflecting plate of the first invention, in which a crystal size of silver or silver alloy having silver as a main component, of which said reflective layer is made, is 200 nm or less;

the fifth invention relates to the light reflecting plate of the first invention, in which said organic resin is an organic resin material for coating use selected from the group of urethane resin, acrylic resin, acrylic urethane resin, polyester resin, fluorine resin, epoxy resin, polycarbonate resin, vinyl chloride resin, vinyl acetate resin, ABS resin (acrylonitrile-butadiene-styrene copolymer synthetic resin), polyamide resin, polyimide resin, polystyrene resin, phenol resin, urea resin, melamine resin and acetal resin, or is an organic resin material for film use selected from the group of polyolefine resin represented by polyethylene and polypropylene, polyvinyl alcohol resin, acetate resin, polystyrene resin, fluorine resin, polycarbonate resin, polyamide resin, polyimide resin, polyvinyl chloride resin, polyvinylidene chloride resin, polyester resin, urethane resin and acrylic resin;

the sixth invention related to the light reflecting plate of the first invention, in which said inorganic material is a simple substance selected from the group of silica, alumina, zirconium oxide, titanium oxide and hafnium oxide, or mixture containing two types or more thereof;

the seventh invention related to the light reflecting plate of the first invention, in which said protective layer is made of any one type selected from the group of organic resin, silica, alumina, zirconium oxide, titanium oxide and hafnium oxide, or mixture containing two types or more thereof; and the eighth invention related to the light reflecting plate of the first invention, in which said protective layer is formed of two layers of organic resin film and inorganic film, the inorganic film made of any one type selected from the group of silica, alumina, zirconium oxide, titanium oxide and hafnium oxide, or mixture containing two types or more thereof.

The ninth invention relates to a method of manufacturing a light reflecting plate including the steps of: forming a binder layer made of organic resin or an inorganic material on a substrate formed of a metal plate; forming a reflective layer made of any one of silver and silver alloy having silver as a main component on the binder layer by electroless plating; and forming a protective layer on the reflective layer;

The tenth invention relates to the method of manufacturing a light reflecting plate of the ninth invention, in which said metal plate is surface treated steel sheet, stainless steel plate, aluminum plate or aluminum alloy plate;

the eleventh invention relates to the method of manufacturing a light reflecting plate of the tenth invention, in which said surface treated steel sheet is steel sheet containing iron as a main component and chromium by less than 11%;

the twelfth invention relates to the method of manufacturing a light reflecting plate of the ninth invention, in which in the formation of said reflective layer made of any one of silver and silver alloy having silver as a main component, a crystal size of said silver or silver alloy having silver as a main component is adjusted to become 200 nm or less;

the thirteenth invention relates to the method of manufacturing a light reflecting plate of the ninth invention, in which said reflective layer is formed by said electroless plating using aqueous solution containing silver and reducer aqueous solution, pH of said reducer aqueous solution is 8 to 12, and liquid temperature is 20° C. or more and 30° C. or less;

the fourteenth invention relates to the method of manufacturing a light reflecting plate of the ninth invention, in which said organic resin is an organic resin material for coating use selected from the group of urethane resin, acrylic resin, acrylic urethane resin, polyester resin, fluorine resin, epoxy resin, polycarbonate resin, vinyl chloride resin, vinyl acetate resin, ABS resin (acrylonitrile-butadiene-styrene copolymer synthetic resin), polyamide resin, polyimide resin, polystyrene resin, phenol resin, urea resin, melamine resin and acetal resin, or is an organic resin material for film use selected from the group of polyolefine resin represented by polyethylene or polypropylene, polyvinyl alcohol resin, acetate resin, polystyrene resin, fluorine resin, polycarbonate resin, polyamide resin, polyimide resin, polyvinyl chloride resin, polyvinylidene chloride resin, polyester resin, urethane resin and acrylic resin;

the fifteenth invention relates to the manufacturing method of a light reflecting plate of the ninth invention, in which said inorganic material is a simple substance selected from the group of silica, alumina, zirconium oxide, titanium oxide and hafnium oxide, or mixture containing two types or more thereof;

the sixteenth invention relates to the method of manufacturing a light reflecting plate of the ninth invention, in which said protective layer is made of any one type selected from the group of organic resin, silica, alumina, zirconium oxide, titanium oxide and hafnium oxide, or mixture containing two types or more thereof;

the seventeenth invention relates to the method of manufacturing a light reflecting plate of the ninth invention, in which said protective layer is formed of two layers of organic resin film and inorganic film, the inorganic film made of any one type selected from the group of silica, alumina, zirconium oxide, titanium oxide and hafnium oxide, or mixture containing two types or more thereof;

the eighteenth invention relates to a light reflecting device including a first light reflecting plate having: a substrate formed of a metal plate; a binder layer made of an organic resin or an inorganic material, which is formed on said substrate; a reflective layer formed of a plated layer of silver or silver alloy having silver as a main component, which is formed on said binder layer; and a protective layer formed on said reflective layer;

the nineteenth invention relates to the light reflecting device including a light reflecting plate manufactured by the method of manufacturing a light reflecting plate of the ninth invention;

the twentieth invention relates to the light reflecting device of the eighteenth or the nineteenth invention, in which the device is any one of the mirror duct in which said light reflecting plate is provided on the inner wall of a light guiding section, an illumination fixture equipped with said light reflecting plate of a light source, a liquid crystal display device equipped with said light reflecting plate of external incident light, an edge-lighting type backlight of a liquid crystal display device equipped with said light reflecting plate, a liquid crystal display device equipped with said edge-lighting type backlight, a reflector for flash use of a digital camera, and a freezer showcase.

In the light reflecting plate of the present invention, the binder layer made of organic resin is laid between the substrate made of the metal plate and the reflective layer made of a plated layer of silver or silver alloy having silver as a main component.

Therefore, a reflective layer made of a plated layer can be formed on a substrate made of a metal plate with good adhesiveness.

Further, when the galvanized or zinc alloy plated steel sheet is used as a substrate, it is inexpensive comparing to stainless steel plate, aluminum plate or aluminum alloy plate. Further, it is excellent in workability and strength comparing with the glass substrate.

Further, in the case where the binder layer under reflective layer is formed by a coating method using organic resin or an inorganic material, the surface of binder layer can be easily made flat, and thus the reflective layer (silver film) on the binder layer becomes flat to make regular reflectance higher.

In the case where both the binder layer under the reflective layer and the protective film are made of an inorganic material, it is excellent in heat resistance, and furthermore, it is possible to prevent migration of silver atoms in the reflective layer (silver film) that is sandwiched between them, so that reliability can be improved.

Further, reflective film that functions to reflect light is made of silver or silver alloy having silver as a main component and formed by a plating method, so that it does not require expensive manufacturing facility unlike a vacuum evaporation process and it can be manufactured inexpensively.

BRIEF DESCRIPTION OF THE DRAWINGS

FIG. 4 is a view showing test conditions of examples of the present invention and a comparative example.

FIG. 5 is a view showing other test conditions of the examples of the present invention and the comparative example.

FIG. 6 is a view showing the characteristics evaluation results of the examples of the present invention and the comparative example.

DETAILED DESCRIPTION OF THE EMBODIMENTS

Figure 1:
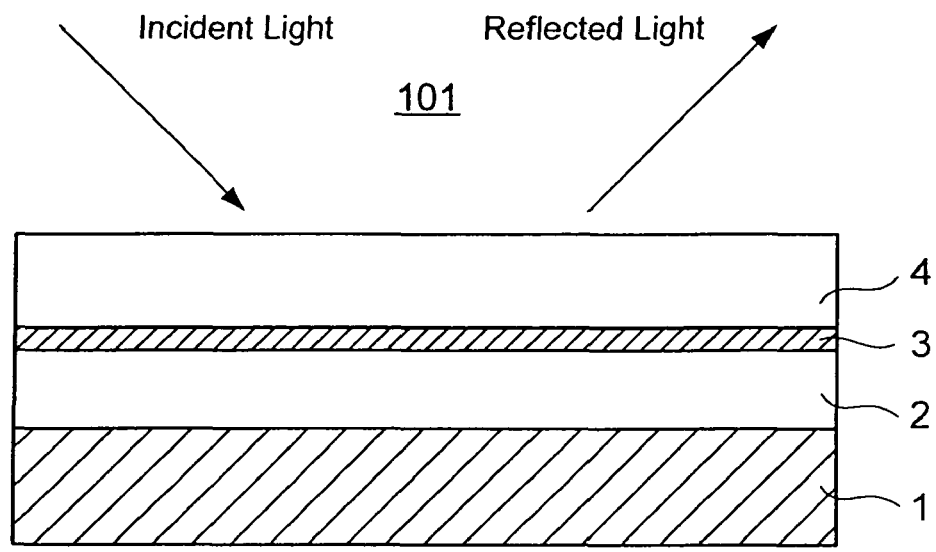
FIG. 1 is a cross-sectional view of the light reflecting plate according to the first embodiment of the present invention.

Next, description will be made for embodiments of the present invention referring to the drawings based on the items below.
(Explanation Items)
(Light reflecting plate of the first embodiment of the present invention)
(i) Structure of the light reflecting plate
(ii) Method of manufacturing the light reflecting plate
(iii) Performance comparison of the light reflecting plate
(Light reflecting plate of the second embodiment of the present invention)
(Light reflecting plate of the third embodiment of the present invention)
(i) Mirror duct
(ii) Edge-lighting type backlight and liquid crystal display device
(iii) Illumination fixture and others
(Light reflecting plate of the first embodiment of the present invention)
(i) Structure of the Light Reflecting Plate FIG. 1 is a cross-sectional view showing the structure of the light reflecting plate of the first embodiment of the present invention.

As shown in FIG. 1, the light reflecting plate 101 is formed by stacking a binder layer 2, a reflective layer 3 and a protective layer 4 in order from the bottom on the surface of a substrate 1.

The substrate 1 is made of surface treated steel sheet, stainless steel plate, aluminum plate or aluminum alloy plate.

Steel sheet used as a base plate of the surface treated steel sheet is an inexpensive material comparing with the aluminum plate or the stainless steel plate, and the inexpensive material for use is a material containing iron as a main component and chromium by less than 11%.

Zinc or the like is plated on the steel sheet for rustproofing. On the other hand, the stainless steel plate, unlike the case of the steel sheet containing chromium by less than 11%, is not coated with galvanization or the like, and it is used as it is. Because the stainless steel plate contains iron as a main component and chromium by 11% or more and does not rust.

The surface treated steel sheet includes several types of galvanized steel sheet due to plating methods. For example, there are hot-dip galvanized steel sheet, hot-dip zinc alloy plated steel sheet, hot-dip galvannealed steel sheet, electrolytic galvanized steel sheet, electrolytic zinc alloy plated steel sheet and the like.

Zinc or zinc alloy is used as a plating material. Zinc alloy for use is zinc alloy containing aluminum (Al) of 5 or 55% by mass in addition to zinc (Zn), or zinc alloy containing cobalt (Co) and molybdenum (Mo) in addition to zinc (Zn) or the like. Another zinc alloy for use is zinc alloy containing nickel (Ni) or iron (Fe) in addition to zinc (Zn), or zinc alloy containing aluminum (Al) and magnesium (Mg) in addition to zinc (Zn).

Although the galvanized steel sheet may be used directly as a substrate, chemical treatment may be further applied to prevent peel or degeneration (or alteration) of plated zinc or the like. Applicable chemical treatment is chromate treatment, phosphate treatment, lithium-silicate treatment, silane coupling treatment, zirconium treatment or the like, for example.

The desirable surface treated steel sheet is an inexpensive zinc or zinc alloy plated material with sacrificial corrosion-protection curing, but additionally, applicable surface treated steel sheet is surface treated steel sheet which is coated with plating of nickel, chromium, copper or tin, or with alloy plating having these materials as a main component.

The stainless steel plate for use is a material containing iron as a main component and chromium by 11% or more. The stainless steel plate can be directly applied as a substrate because it is hard to rust. For example, the applicable stainless steel plate is described in JIS G 4304 or JIS G 4305.

A substrate formed of the aluminum plate or aluminum alloy plate for use is described in JIS H 4000.

The binder layer 2 is made of organic resin film. The organic resin film for use is a film formed by coating an organic resin material or film processed to film state.

The preferable organic resin material for coating use is urethane resin, acrylic resin, acrylic urethane resin, polyester resin, fluorine resin, epoxy resin, polycarbonate resin, vinyl chloride resin, vinyl acetate resin, ABS resin (acrylonitrile-butadiene-styrene copolymer synthetic resin), polyamide resin, polyimide resin, polystyrene resin, phenol resin, urea resin, melamine resin, acetal resin or the like.

Further, the preferable organic resin material for film use is polyolefine resin such as polyethylene or polypropylene, polyvinyl alcohol resin, acetate resin, polystyrene resin, fluorine resin, polycarbonate resin, polyamide resin, polyimide resin, polyvinyl chloride resin, polyvinylidene chloride resin, polyester resin, urethane resin, acrylic resin or the like.

To apply for the organic resin film coated or processed to film state, the above-described resin may be used in a simple substance, or mixture made of two types or more selected from the above-described resin materials.

The organic resin film using an organic resin material for coating use can be fabricated on the substrate 1 by a roll coating method in which resin solution is dripped on the substrate and thickness of the coated film is adjusted by rolls, an immersion method in which the substrate is immersed into resin solution, a curtain flow method in which resin solution is allowed to flow on the surface of a horizontally traveling substrate, a spray method in which resin solution is sprayed onto the substrate, a sol-gel method in which resin solution is coated onto the substrate and dried, or another coating method. Further, the organic resin film processed to film state can be fabricated on the substrate by adhering it on the substrate 1 via adhesive agent or the like.

In this case, the organic resin film coated or processed to film state may not only be fabricated in single layer on the substrate 1 but also may be fabricated by stacking two layers or more.

In the case of using the organic resin film coated or processed to film state, it is preferable that the overall thickness of the binder layer 2 is in the range from 1 to 20 μm. This is because the thickness of 1 μm or less results in non-smooth surface to lead the binder layer 2 to poor adhesion with silver film provided thereon, and thickness of over 20 μm leads to higher cost.

Other than the above-described one, the binder layer 2 can be made of film made of an inorganic material. The applicable inorganic material is a simple substance selected from the group of of silica, alumina, zirconium oxide, titanium oxide and hafnium oxide, or mixture containing two types or more thereof.

A method of depositing the oxide on the surface of the substrate 1 includes a method in which immersion treatment or electrolytic treatment (cathodic treatment or anodic treatment) is performed to water-dispersed sol aqueous solution containing the above-described inorganic material, for example.

In the case of film made of an inorganic material, the preferable thickness of the binder layer 2 is a range of 0.1 to 5 µm. This is because the thickness of less than 0.1 µm results in non-smooth surface to lead the binder layer 2 to poor adhesion with silver film provided thereon, and the thickness over 5 µm results in too-thick oxide to easily lead to a cohesive failure and furthermore higher cost.

Further, corona discharge treatment or glow discharge treatment may be applied to the surface of the binder layer 2. This further improves adhesion with a silver layer stacked thereon.

Desirable roughness Ra (JIS B0601) of the surface of the binder layer 2 is less than 0.1 µm. This is because roughness Ra of 0.1 µm or more results in insufficient flatness of the surface to make it difficult for the spray plating method to uniformly deposit silver film on the surface of the binder layer 2.

The reflective layer 3 is formed of film made of silver or silver alloy containing silver as a main component. The preferable silver alloy corresponds to what tin, indium, zinc, nickel, copper or palladium is added to silver. Preferable loadings of metal to be added are 3% by mass or less. This is because the loadings of more than 3% by mass result in abrupt reduction of light reflectance.

The preferable thickness of the reflective layer 3 is at a range of 50 to 350 nm. Particularly preferable thickness is at a range of 70 to 150 nm, and thereby high light reflectance to visible light can be obtained. The reason why the thickness is set to the range of 50 to 350 nm is because thickness of less than 50 nm is too thin and thus it leads to low light reflectance, and thickness over 350 nm results in little change of light reflectance while leading to higher costs.

Further, for improving the light reflectance, it is important to adjust the crystal size of silver or silver alloy containing silver as a main component. The smaller the crystal size of silver or silver alloy containing silver as a main component, the higher the light reflectance tends to be. To obtain practically preferable light reflectance, the preferable crystal size of silver or silver alloy containing silver as a main component is 200 nm or less, more desirable one is 100 nm or less, and furthermore desirable one is 50 nm or less.

Silver or the like of the reflective layer 3 can be formed by electroless plating utilizing silver mirror reaction, for example, a spray plating method.

The preferable protective layer 4 is a single layer film of organic resin, an inorganic material, or mixture made thereof. Alternatively, it can be formed of two layers of an organic resin film as a lower layer and an inorganic material film as an upper layer. Alternatively, on the contrary, it can be formed of two layers of an inorganic material film as the lower layer and an organic resin film as the upper layer.

The organic resin of the protective layer 4 for use is acrylic resin, acrylic urethane resin, polyester resin or urethane resin, and out of them, the particularly desirable one is acrylic resin that is hard to be deteriorated and degenerated by light. Further, a preferable inorganic material is silica, alumina, zirconium oxide, titanium oxide, hafnium oxide, or mixture containing two types or more thereof. The inorganic material contained in the protective layer 4 in either a film state or a mixture state improves anti-scratch properties to prevent a scratch from entering a protective layer 5 during processing.

An ultraviolet light absorbing agent and/or an anti-bacterial agent can be added to the protective layer 4, particularly to a top layer. The applicable ultraviolet light absorbing agent is a publicly known agent, for example, salicylic acid system, benzophenone system, benzotriazole system or cyanoacrylate system. A content of the ultraviolet light absorbing agent can be at a range of 0.5 to 2.5 weight part to 100 weight part of a solid matter of an inorganic material or organic resin.

The applicable anti-bacterial agent is a publicly known material such as hinokithiol, chitosan, eucalyptus extract, zinc pyrithione, quaternary ammonium salt, thiabendazole, organic silicon quaternary ammonium salt, penicillin, cephem, aminoglycoside, tetracycline, new quinolone, macrolide or metallic salt of silver, copper, zinc or the like. The anti-bacterial agent can be contained at a range of 0.5 to 15 weight part to 100 weight part of a solid matter of an inorganic material or organic resin.

The desirable overall thickness of the protective layer 4 is at a range of 5 to 30 µm for both a single layer case and a multi layer case. This is because the thickness less than 5 µm causes silver film 3 to discolor in atmosphere containing hydrogen sulfide to lead to reduction of light reflectance. Contrarily, the thickness over 30 µm results in not only higher cost but also reduction of light reflectance.

The protective layer 4 exerts an effect that the reflective layer 3 under the protective layer 4 can not easily be deteriorated or degenerated by ambient environment. Thus, reduction of light reflectance can be prevented.

(ii) Method of Manufacturing a Light Reflecting Plate

Next, description will be made for the method of manufacturing the above-described light reflecting plate 101.

The applicable substrate 1 is surface treated steel sheet, stainless steel plate, aluminum plate or aluminum alloy plate. The desirable surface treated steel sheet is an inexpensive zinc or zinc alloy plated material having sacrificial corrosion-protection curing, but another applicable one is surface treated steel sheet coated with plating of nickel, chromium, copper or tin, or alloy plating having these materials as a main component. The stainless steel plate for use is one containing iron as a main component and chromium by 11% or more. Since the stainless steel plate is hard to rust, it can be directly applied as a substrate. For example, the applicable stainless steel plate is described in JIS G 4304 or JIS G 4305. A substrate made of the aluminum plate or the aluminum alloy plate for use is made of the aluminum plate or aluminum alloy plate described in JIS H 4000.

First, description will be made for an example using the substrate 1 formed of the galvanized steel sheet. An applicable method of galvanization or zinc alloy plating is any one of hot-dip galvanizing method, hot-dip zinc alloy plating method, electrolytic galvanizing method and electrolytic zinc alloy plating method.

The hot-dip galvanizing method or the hot-dip zinc alloy plating method is a method in which steel sheet is immersed into hot-dipped zinc or into hot-dipped zinc alloy to coat zinc or zinc alloy. Further, the electrolytic galvanizing method or the electrolytic zinc alloy plating method is a method in which steel sheet is immersed into plating liquid in which zinc or the like is dissolved, or into plating liquid in which zinc alloy or the like is dissolved, and then a voltage is applied between the steel sheet and a zinc anode (or an insoluble anode) to deposit zinc or zinc alloy.

Next, the binder layer 2 is formed on the prepared substrate 1. An applicable deposition method of the binder layer 2 made of organic resin is any one of a roll coating method, an immersion method, a curtain flow method, a spray method and a sol-gel method.

The roll coating method is a method in which organic resin solution is dripped on the substrate to adjust the thickness of film by rolls. The immersion method is a method in which the substrate is immersed in organic resin solution. The curtain flow method is a method in which organic resin solution is allowed to flow on the surface of the horizontally traveling substrate. The spray method is a method in which resin solution is sprayed on the substrate. The sol-gel method is a method in which organic resin solution is coated on the substrate to dry it.

Further, other than the organic resin, the binder layer 2 made of an inorganic material can be formed on the above-described prepared substrate 1. A deposition method of the binder layer 2 made of an inorganic material for use is either one of methods in which immersion treatment or electrolytic treatment (cathodic treatment, or anodic treatment) is applied to water-dispersed sol aqueous solution containing an inorganic material.

Next, for degreasing a surface of the binder layer 2, the surface of the binder layer 2 is cleaned by alkaline solution. Subsequently, the above-described substrate 1 is rinsed by using ion-exchanged water or distilled water and then dried. Note that there is a case of no need for cleaning by alkaline solution depending on the surface condition of the binder layer 2.

Next, a pre-processing for forming silver film is performed.

The pre-processing is a processing in which after forming tin on the binder layer 2, the tin is displaced with a starting nucleus of silver.

In the pre-processing, first, the surface of the binder layer 2 is subject to coating of aqueous solution (pre-processing activator) that contains stannic chloride containing hydrochloric acid, stannous chloride and ferric chloride, and thus tin as a catalyst is formed on the surface of the binder layer 2. Tin formed on the binder layer 2 becomes a starting nucleus for depositing silver to readily deposit silver. It is preferable that aqueous solution containing stannic chloride or the like be adjusted to pH 2 or less.

Next, the surface of the binder layer 2, on which tin is deposited, is cleaned by using ion-exchanged water or distilled water to remove residual aqueous solution containing stannic chloride or the like on the surface of the binder layer 2.

Then, silver nitrate solution is coated on the surface of the binder layer 2. Thus, the previously formed tin is displaced by silver that is deposited on the binder layer 2, and the starting nucleus of silver is formed.

Next, the pre-processing in this manner is followed by a process of depositing silver film being the reflective layer 3 on the binder layer 2 by the spray plating method using silver mirror reaction.

In the spray plating method, the ammoniacal silver nitrate aqueous solution $(4(\{Ag(NH_3)_2\}NO_3)$ and aqueous solution containing reducer (hydrazine sulfate) are simultaneously ejected on the surface of the pre-processed binder layer 2. The applicable reducer aqueous solution is one dissolving reducer in water or diluting it and adding sodium hydroxide thereto into alkaline. Thus, silver deposits on the surface of the binder layer 2 based on the starting nucleus of silver, and silver film is formed.

At this point, it is important to set the crystal size of silver film to 200 nm or less in order to obtain high reflectance. This is attained by adjusting pH of the reducer aqueous solution and temperature of the ammoniacal silver nitrate aqueous solution and the reducer aqueous solution. The adjustment of the amount of sodium hydroxide sets pH of the reducer aqueous solution to 8 to 12, more preferably to 9 to 11. Here, since deposition of silver can be easily controlled by management of the pH of the ammoniacal silver nitrate aqueous solution, it is set to pH 10 to 13, more preferably to pH 11 to 12. Further, the temperature of the ammoniacal silver nitrate aqueous solution and the reducer aqueous solution is set to 25° C.±5° C. Now, since this temperature range gives little change in the deposition speed of silver according to the observation, there is also an effect that the range is most preferable for controlling the crystal size by pH adjustment.

Further, the crystal size of silver can be controlled by changing a concentration ratio between the ammoniacal silver nitrate aqueous solution $(4\{Ag(NH_3)_2\}NO_3)$ and the reducer (containing hydrazine sulfate) aqueous solution. By making the concentration of silver nitrate smaller than the concentration of hydrazine sulfate in reducer aqueous solution, the crystal size of silver becomes smaller. Specifically, the lower the concentration silver sulfate than the concentration of hydrazine sulfate, the smaller the crystal size of silver becomes, and as a result, reflectance becomes higher. For example, in the case of setting the concentration of hydrazine sulfate to 8 g/L, it is desirable that the concentration of silver nitrate be a ratio of 0.2 to 1 to the concentration of hydrazine sulfate.

Meanwhile, since deposition speed becomes too fast if the pH of the reducer aqueous solution becomes larger than the above-described range, frost occurs on the silver film to reduce light reflectance. Contrarily, since deposition speed becomes too slow if the pH of the reducer aqueous solution becomes smaller than the above-described range, sufficient film thickness cannot be secured. This case cannot bring high light reflectance as well. Further, in the case of the low temperature of the reducer aqueous solution, silver is hard to deposit because of weak silver mirror reaction. On the contrary, if the temperature is high, deposition speed of silver becomes too fast and frost occurs on silver film.

Next, the substrate 1 is cleaned by using ion-exchanged water or distilled water to remove residual ammoniacal silver nitrate aqueous solution and reducer aqueous solution on the surface of the reflective layer 3. Subsequently, neutralization treatment is performed by using sodium thiosulfate aqueous solution. The neutralization treatment further removes residual chlorine (Cl) contained in plating liquid on the surface of the reflective layer 3.

Next, after cleaning the substrate 1 by using ion-exchanged water or distilled water, water droplets attached to the surface of the reflective layer 3 are blown out by airblow. That is followed by a drying process for drying the substrate 1. Drying conditions are set to the temperature of 70° C. for 20 minutes, for example.

Next, a protective film 4 made of organic resin or an inorganic material is deposited on the reflective layer 3. The protective film 4 can be deposited by the same method as the deposition method of the binder layer 2.

As described above, according to manufacturing method of a light reflecting plate of this embodiment, the spray plating method is used as a forming method of the silver film, so that a metal plate does not melt nor is the silver film peeled by the existence of the binder layer 2. Thus, film peel does not occur even if the metal plate is used, and the light reflecting plate of high reflecting characteristics can be obtained.

Note that electroless plating by the spray plating method is used as a forming method of the silver film in the above-described manufacturing method of a light reflecting plate, but electroless plating by an immersion plating method can be used. In the case of electroless plating by the immersion plating method, control of the crystal size can be similarly performed as described above by the pH of reducer aqueous solution in plating liquid containing the ammoniacal silver nitrate aqueous solution and the reducer aqueous solution and by the temperature of plating liquid.

Further, in the case of using the organic resin film processed to film state as the binder layer 2, the organic resin film on which the reflective layer 3 and the protective layer 4 are formed is adhered onto a metal plate by adhesive agent. Alternatively, adhesive agent is coated on the substrate 1 made of metal plate, and the organic resin film is adhered onto the surface of the adhesive agent. After that, the reflective layer 3 and the protective layer 4 may be formed on the organic resin film.

(iii) Performance Comparison of Light Reflecting Plates

Next, description will be made for result examination by comparing the performance of the light reflecting plates of the examples of the present invention with the performance of the light reflecting plate of a comparative example.

(Test Conditions of the Light Reflecting Plate)

Description will be made below for test conditions of the light reflecting plates according to the examples of the present invention and the light reflecting plate according to a comparative example. Examples 1 to 9 are cases where the binder layer is made of organic resin and examples 10 to 18 are cases where the binder layer is made of an inorganic material.

The conditions are described together on the tables of FIGS. 4 and 5.

Example 1

Acrylic urethane resin was coated on the surface of electrolytic galvanized steel sheet (both-side plating, Zn plating amount on one side: 20 g/m$^2$) having the plate thickness of 0.5 mm and dried. The coating thickness after drying was set to approximately 1 μm. Subsequently, the silver film was coated by silver mirror reaction at the thickness of approximately 70 nm. Next, acrylic resin was coated on the surface of the silver film and dried. The film thickness after drying was set to approximately 6 μm. Moreover, aqueous solution containing silica sol was coated and dried. The thickness of silica film after drying was set to 0.05 μm.

Example 2

Zinc phosphate treatment having the film thickness of 1000 mg/m$^2$ was applied on the surface of electrolytic galvanized steel sheet (both-side plating, Zn plating amount on one side: 20 g/m$^2$) having the plate thickness of 0.5 mm, polyester resin film having the thickness of 15 μm was laminated on the zinc phosphate treated film by thermo-compression bonding. Subsequently, on the top of it, the silver film was coated at the thickness of 150 nm by silver mirror reaction. Next, the substrate was immersed into aqueous solution containing alumina sol, and alumina film was coated on the surface of the silver film at the thickness of 0.03 μm. Moreover, acrylic urethane resin was coated on the surface of alumina film and dried. The coating thickness after drying was set to 6 μm.

Example 3

A hot-dipped zinc-55% by mass aluminum alloy plating steel sheet having the plate thickness of 0.5 mm was prepared. Note that the steel sheet is called a Galvalume steel sheet. Polycarbonate resin was coated on the surface thereof and dried. The coating thickness after drying was set to 5 μm. Subsequently, the silver film was coated at the thickness of 100 nm by silver mirror reaction. Next, acrylic resin was coated on the surface of the silver layer and dried. The coating thickness after drying was set to 25 μm.

Example 4

ABS resin (acrylonitrile-butadiene-styrene copolymer synthetic resin) was coated on the surface of electrolytic galvanized steel sheet (both-side plating, Zn plating amount on one side: 20 g/m$^2$) having the plate thickness of 0.5 mm and dried. The thickness after drying was set to 5 μm. Subsequently, the silver film was coated at the thickness of 83 nm by silver mirror reaction. Next, acrylic resin containing 3% by mass of alumina was coated on the surface of the silver film and dried. The thickness after drying was set to 10 μm.

Example 5

Electrolytic zinc-cobalt-molybdenum composite coated steel sheet (both-side plating, Zn plating amount on one side: 20 g/m$^2$) having the plate thickness of 0.5 mm was prepared. Chromate treatment (both-side processing, 40 mg/m$^2$ of Cr attached per one side) was applied on the surface thereof. Moreover, on the top of it, acrylic urethane resin was coated and dried. The coating thickness after drying was 10 μm. Subsequently, the silver film was coated at the thickness of 130 nm by silver mirror reaction. Next, acrylic urethane resin was coated on the surface of the silver film and dried. The coating thickness after drying was 6 μm.

Example 6

Electrolytic galvanized steel sheet (both-side plating, Zn plating amount on one side: 20 g/m$^2$) having the plate thickness of 0.5 mm was prepared. Chromate treatment (both-side processing, 10 mg/m$^2$ of Cr attached per one side) was applied on the surface thereof. On the top of it, acrylic urethane resin was coated and dried. The coating thickness after drying was 15 μm. Subsequently, the silver film was coated at the thickness of 70 nm by silver mirror reaction. Next, the substrate was immersed into aqueous solution containing alumina sol, cathodic treatment was performed by using the substrate as a cathode and the stainless steel sheet as an anode, and dried. After drying, a film thickness of alumina layer deposited on the surface of the silver film on substrate was 0.1 μm. Moreover, polyester resin was coated on the surface of alumina layer and dried. The coating thickness after drying was 6 μm.

Example 7

A substrate made of stainless steel plate (SUS304) having the plate thickness of 0.5 mm was prepared, and polyimide resin was coated on the surface thereof and dried. The film thickness after drying was 3 μm. Subsequently, the silver film was coated at the thickness of 150 nm by silver mirror reaction. Next, the substrate was immersed into aqueous solution containing zirconium oxide sol, cathodic treatment was performed by using the substrate as a cathode and the stainless steel sheet as an anode, and dried. After drying, a film thickness of zirconium oxide layer deposited on the surface of the silver film on the substrate was 0.05 μm. Moreover, acrylic urethane resin was coated on the surface of zirconium oxide layer and dried. The cotaing thickness after drying was 8 μm.

Example 8

A substrate made up of Al plate (JIS H 4000, alloy number: 1050) having the plate thickness of 0.5 mm was prepared, urethane resin was coated on the surface thereof and dried. The coating thickness after drying was 12 μm. Subsequently, the silver film was coated at the thickness of 120 nm by silver mirror reaction. Next, acrylic resin containing 3% by mass of silica was coated on the surface of the silver film and dried. The film thickness after drying was 15 μm. Moreover, acrylic urethane resin was coated on the surface of acrylic resin containing 3% by mass of silica and dried. The coating thickness after drying was 3 μm.

Example 9

A substrate made of Al alloy plate (JIS H 4000, alloy number: 5052) having the plate thickness of 0.5 mm was prepared, acrylic urethane resin was coated on the surface thereof and dried. The coating thickness after drying was 15 μm. Subsequently, the silver film was coated at the thickness of 75 nm by silver mirror reaction. Next, polyester resin film having the thickness of 15 μm was laminated on the surface of the silver film by thermo-compression bonding. Moreover, acrylic resin containing 2% by mass of silica was coated on polyester resin film surface and dried. The coating thickness after drying was 3 μm.

Example 10

Aqueous solution containing alumina sol was coated on the surface of electrolytic galvanized steel sheet (both-side plating, Zn plating amount on one side: 20 g/m$^2$) having the plate thickness of 0.5 mm, and dried. The thickness of alumina film after drying was 0.1 μm. Subsequently, the silver film was deposit at the thickness of 100 nm by silver mirror reaction. Next, acrylic resin was coated on the surface of the silver film and dried. The thickness after drying was 6 μm. On the top of it, aqueous solution containing silica sol was further coated and dried. The thickness of silica layer after drying was 0.05 μm.

Example 11

An electrolytic galvanized steel sheet (both-side plating, Zn plating amount on one side: 20 g/m$^2$) having the plate thickness of 0.5 mm was prepared. Next, zinc phosphate treatment of the coating thickness of 700 mg/m$^2$ was applied, and the galvanized steel sheet was immersed into aqueous solution containing silica sol, electrolytic treatment was performed on the top of the zinc phosphate treatment coating by aqueous solution containing silica sol by using the galvanized steel sheet as a cathode and the stainless steel sheet as an anode, and dried. Thus, silica layer having the layer thickness of 0.2 μm was deposited on the surface of the galvanized steel sheet. Subsequently, the silver film was deposit on the silica layer at the thickness of 120 nm by silver mirror reaction. Next, the substrate was immersed into aqueous solution containing alumina sol, and alumina layer was deposited on the silver film at the layer thickness of 0.03 μm. Moreover, acrylic urethane resin was coated on the alumina layer, and dried. The thickness after drying was 6 μm.

Example 12

Aqueous solution containing hafnium oxide sol was coated on the surface of hot-dipped zinc-55% by mass aluminum alloy plated steel sheet having the plate thickness of 0.5 mm, and dried. The thickness of hafnium oxide after drying was 1 μm. Subsequently, the silver film was deposit at the thickness of 150 nm by silver mirror reaction. Next, acrylic resin was coated on the surface of the silver film and dried. The thickness after drying was 25 μm.

Example 13

An electrolytic galvanized steel sheet (both-side plating, Zn plating amount on one side: 20 g/m$^2$) having the plate thickness of 0.5 mm was prepared. The galvanized steel sheet was immersed into aqueous solution containing titanium oxide sol, cathodic treatment was performed by using the galvanized steel sheet as a cathode and the stainless steel sheet as an anode, and dried. After drying, layer thickness of titanium oxide deposited on the surface of the silver film on substrate was 0.5 μm. Subsequently, the silver film was coated at the thickness of 50 nm by silver mirror reaction. Next, acrylic resin containing 3% by mass of alumina was coated on the surface of the silver layer and dried. The thickness after drying was 10 μm.

Example 14

An electrolytic zinc-cobalt-molybdenum composite coated steel sheet (both-side plating, Zn plating amount on one side: 20 g/m$^2$) having the plate thickness of 0.5 mm was prepared. Chromate treatment (both-side processing, 40 mg/m$^2$ of Cr attached per one side) was applied on the surface thereof. Moreover, aqueous solution containing zirconium oxide sol was coated on the top of it, and dried. The thickness of zirconium oxide film after drying was 2 μm. Subsequently, the silver film was coated at the thickness of 250 nm by silver mirror reaction. Next, acrylic urethane resin was coated on the surface of the silver film and dried. The thickness after drying was 6 μm. Moreover, the above-described processed electrolytic galvanized steel sheet was immersed into aqueous solution containing silica sol and dried. Thus, silica layer having the thickness after drying of 0.1 μm was deposited.

Example 15

An electrolytic galvanized steel sheet (both-side plating, Zn plating amount on one side: 20 g/m$^2$) having the plate thickness of 0.5 mm was prepared. Chromate treatment (both-side processing, 10 mg/m$^2$ of Cr attached per one side) was applied on the surface thereof. Next, the substrate was immersed into aqueous solution containing silica sol and alumina sol, cathodic treatment was performed by using the substrate as a cathode and the stainless steel sheet as an anode, and dried. After drying, the film thickness of layer made of mixture of silica and alumina, which was deposited on the substrate, was 3 μm. Subsequently, the silver film was deposited at the thickness of 70 nm by silver mirror reaction. Next, the substrate was immersed into aqueous solution containing alumina sol, cathodic treatment was performed by using the substrate as a cathode and the stainless steel sheet as an anode, and dried. After drying, the layer thickness of alumina film deposited on the silver film surface of the substrate was 0.1 μm. Moreover, polyester resin was further coated on the surface of the alumina layer and dried. The thickness after drying was 6 μm.

Example 16

A substrate made up of stainless steel plate (SUS304) having the plate thickness of 0.5 mm was prepared, silica was coated on the surface thereof and dried. Specifically, the substrate was immersed into aqueous solution containing silica sol, cathodic treatment was performed by using the substrate as a cathode and the stainless steel plate as an anode, and the layer thickness after drying was 0.2 μm. Subsequently, the silver film was coated at the thickness of 150 nm by silver mirror reaction. Next, the substrate was immersed into aqueous solution containing silica sol, cathodic treatment was performed by using the substrate as a cathode and the stainless steel plate as an anode, and dried. After drying, the thickness of silica layer deposited on the surface of the silver film on substrate was 0.05 μm. Moreover, acrylic urethane resin was coated on the surface of silica film and dried. The thickness after drying was 8 μm.

Example 17

An Al plate (JIS H 4000, alloy number: 1050) having the plate thickness of 0.5 mm was prepared, and alumina was coated on the surface thereof and dried. Specifically, the substrate was immersed into aqueous solution containing alumina sol, cathodic treatment was performed by using the substrate as a cathode and the stainless steel plate as an anode, and the layer thickness after drying was 0.3 μm. Subsequently, the silver film was coated at the thickness of 120 nm by silver mirror reaction. Next, acrylic resin containing 3% by mass of silica was coated on the surface of the silver film and dried. The film thickness after drying was 15 μm. Moreover, acrylic urethane resin was coated on the surface of acrylic resin containing 3% by mass of silica, and dried. The thickness after drying was 3 μm.

Example 18

An Al alloy plate (JIS H 4000, alloy number: 5052) having the plate thickness of 0.5 mm was prepared, and mixture of alumina and silica was coated on the surface thereof and dried. Specifically, the substrate was immersed into aqueous solution containing alumina sol and silica sol, cathodic treatment was performed by using the substrate as a cathode and the stainless steel plate as an anode, and the thickness after drying was 0.1 μm. Subsequently, the silver film was coated at the thickness of 75 nm by silver mirror reaction. Next, polyester resin film having the thickness of 15 μm was laminated on the surface of the silver film by thermo-compression bonding. Moreover, acrylic resin containing 2% by mass of silica was coated on the surface of polyester resin film, and dried. The thickness after drying was 3 μm.

Comparative Example 1

Silver film was coated at the thickness of 70 nm on the surface of electrolytic galvanized steel sheet (both-side plating, Zn plating amount on one side: 20 g/m$^2$) having the plate thickness of 0.5 mm by silver mirror reaction. Next, acrylic resin was coated on the surface of the silver film and dried. The thickness after drying was 40 μm. On the top of it, aqueous solution containing silica sol was further coated and dried. The thickness of silica after drying was 0.05 μm.

(Characteristics Evaluation)

Characteristics evaluation was performed to the light reflecting plates according to the examples, which were fabricated described above, and the light reflecting plate according to comparative examples by the evaluation method and conditions shown below. The evaluation results are shown on the table FIG. 6.

(Evaluation Method and Conditions of Light Reflectance)

CM-3500d (light source: D65, aperture: 8 mm) manufactured by Minolta was used as a measurement device, and light reflectance at wavelength 550 nm was measured according to JIS Z8722. Note that calibration was performed based on the reflectance of a barium sulfate standard white plate.

Light reflectance of 90% or more was indicated by ○ mark and less than 90% was indicated by X mark. Light reflectance of 90% or more is practical and it was set as an acceptable range.

(Method and Conditions of Gas Test)

Samples were left to stand in atmosphere containing 1.5 ppm of $H_2S$ and 3 ppm of $NO_2$ (temperature: 30° C., humidity: 70% RH) for 24 hours, and reduction rate of regular reflectance was measured. The regular reflectance was measured at the wavelength of 550 nm, and (initial light regular reflectance−light regular reflectance after passing 24 hours)× 100/initial light regular reflectance was defined as the reduction rate of regular reflectance.

In the measurement result, reduction rate 10% or more was indicated by x mark, and less than 10% was indicated by ○ mark. The reduction rate of less than 10% is practical, and it was treated as an acceptable value.

(Method and Conditions of Adhesion Test)

The test was performed by adhering adhesive tape on the light reflecting plate and peeling it off. One having film peel was indicated by x mark, and one having no film peel was indicated by ○ mark.

(Evaluation Result)

According to the table of FIG. 6, film peel did not occur in Examples 1 to 18 because the binder layer was provided. Further, since the thickness of the protective layer 4 is 5 to 30 μm, deterioration of regular reflectance with time is small and satisfactory.

On the other hand, since Comparative example 1 was not provided with the binder layer, film peel occurred at the interface between the galvanized steel sheet and the silver film. Further, it had a large reduction rate of regular reflectance.

As described above, in the light reflecting plate 101 according to the embodiment of the present invention, the binder layer 2 made of organic resin or an inorganic material is laid between the substrate 1 made of metal plate and the reflective layer 3 made up of a plated layer of silver or silver alloy having silver as a main component.

Therefore, the reflective layer 3 made of the plated layer can be formed on the substrate 1 made of metal plate with good adhesiveness.

Since the substrate 1 made of metal plate is used, it has excellent workability and strength comparing to a glass substrate. In the case of using the substrate 1 in which galvanization or zinc alloy plating is applied to steel sheet, it is inexpensive comparing to stainless steel plate, aluminum plate or aluminum alloy plate.

Further, in the case where the binder layer 2 being the base of the reflective layer 3 is formed by a coating method using organic resin or an inorganic material, the surface of the binder layer 2 can be easily made flat, the reflective layer 3 on the binder layer 2 becomes flat, the light reflecting plate with high regular reflectance can be obtained.

Further, the reflective layer 3 that functions to reflect light is made of silver or silver alloy having silver as a main component, and formed by a plating method, so that it does not require an expensive manufacturing facility unlike a vacuum evaporation process, and can be manufactured inexpensively.

(Light Reflecting Plate according to the Second Embodiment of the Present Invention)

Next, description will be made for the light reflecting plate according to the second embodiment of the present invention.

In the light reflecting plate 101 of the above-described first embodiment, reflected light tends to be yellowish. This is considered to be because the silver film or the like absorbs light of a wavelength corresponding to blue. Then, this embodiment had a constitution that blue system pigment was added to the protective layer 4.

As an aspect of the plate, firstly, in the case where the protective layer 4 is a single substance of organic resin or an inorganic material or a single layer made of their mixture, the protective layer 4 is allowed to contain blue system pigment;

secondly, in the case where the protective layer 4 is two layers using organic resin film as a lower layer and using inorganic material film as an upper layer, at least either one layer of the upper layer or the lower layer is allowed to contain blue system pigment; and thirdly, contrarily to the second case, in the case where the protective layer 4 is two layers using inorganic material film as a lower layer and using organic resin film as an upper layer, at least either one layer of the upper layer or the lower layer is allowed to contain blue system pigment.

As a blue system pigment, cobalt blue, cobalt purple, ultramarine, Berlin blue, phthalocyanine blue, indanthrene blue, cerulean blue or Prussian blue can preferably be used. Then, it is preferable that loadings of blue system pigment to the protective layer be a range of 0.05 to 0.5% by mass. When the protective layer is in two layers, blue system pigment is added such that the total loadings on two layers of the protective layer become the range of 0.05 to 0.5% by mass. Loadings of less than 0.05% by mass is not effective to the reflection of blue system color. On the other hand, if the loadings exceed 0.5% by mass, too much blue system color is reflected and yellow being the complementary color of blue is absorbed conversely, and light significantly different from white light is created.

As described, by allowing the protective layer 4 to contain blue system pigment, the blue system pigment in the protective layer 4 reflects blue system light, and absorption of blue system light by the reflective layer 3 made of the silver film or silver alloy film is compensated, light does not create particular color but reflected light directly from the color of sunlight or the light of a light source can be obtained.

As a method of depositing the protective layer 4 of this embodiment, the method of depositing the protective layer of the first embodiment can be used.

Figure 2:
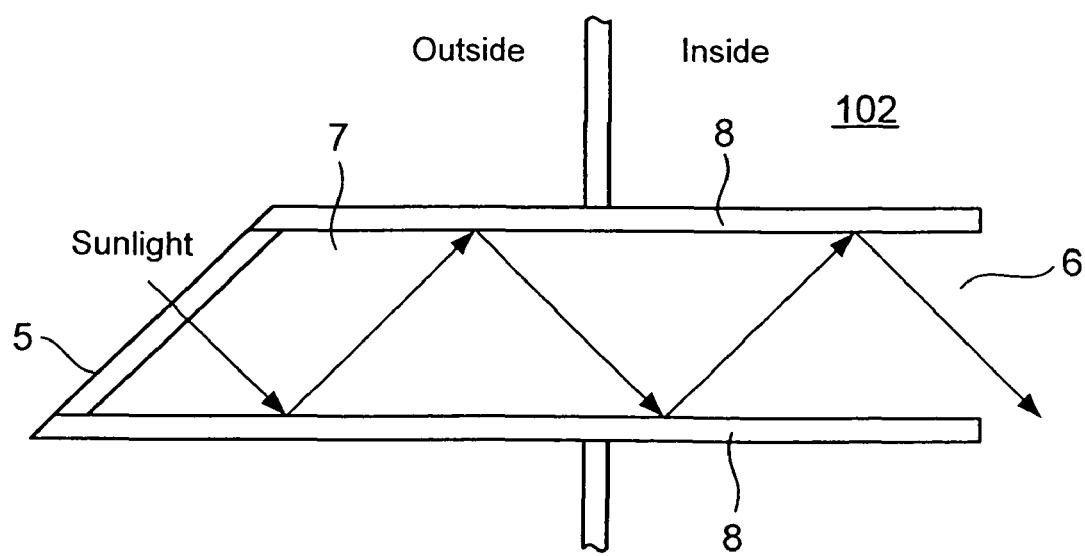
FIG. 2 is a perspective view of a mirror duct using the light reflecting plate according to the third embodiment of the present invention.

(Light Reflecting Device of the Third Embodiment of the Present Invention)
(i) Mirror Duct FIG. 2 is a perspective view showing a constitution of a mirror duct 102 according to the third embodiment of the present invention.

FIG. 2 shows a state where the mirror duct 102 is installed in a house. The mirror duct 102 is equipped with a daylighting section 5, a light emitting section 6 and a light guiding section 7 as shown in FIG. 2. To make light incident from the daylighting section 5 be reflected and transmitted in the light guiding section 7, the light reflecting plate 101 described in the first embodiment is formed on the inner wall of a partition wall 8 of the light guiding section 7. The mirror duct 102 is fabricated by processing the light reflecting plate 101.

In the mirror duct 102, the daylighting section 5 is exposed to the outside so as to receive sunlight, and the light emitting section 6 is installed so as to be exposed to the inside as shown in FIG. 2.

According to the mirror duct 102 described above, it is fabricated by using the light reflecting plate 101 described in the first embodiment, and a mirror duct having high reliability and light reflectance due to no film peel can be provided inexpensively.

Further, by using the light reflecting plate described in the second embodiment, illumination light of the mirror duct does not create particular color but directly shows the color of sunlight.

(ii) Edge-Lighting Type Backlight and Liquid Crystal Display Device

Figure 3A:
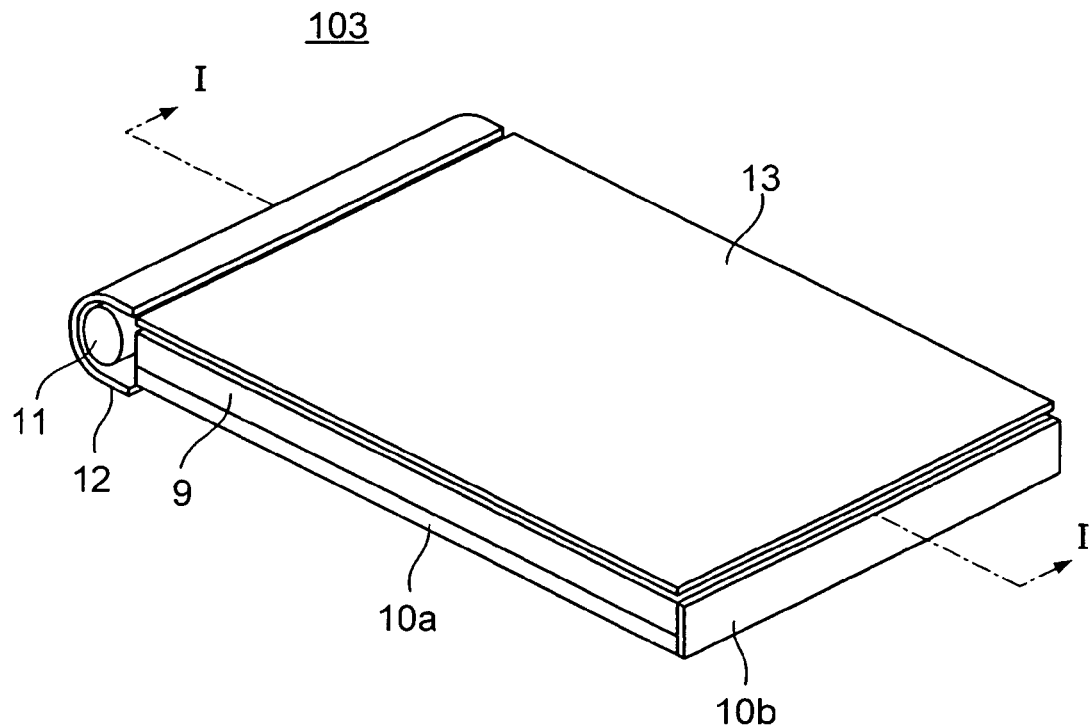
FIG. 3A is a perspective view of an edge-lighting type backlight of a liquid crystal display device using the light reflecting plate according to the second embodiment of the present invention.
Figure 3B:
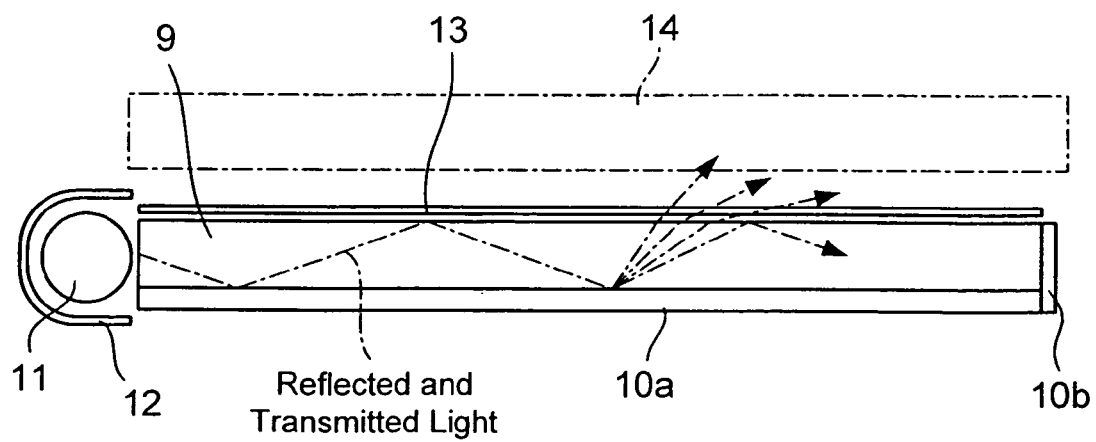
FIG. 3B is a cross-sectional view taken along line I-I of FIG. 3A.

FIG. 3A is a perspective view showing a constitution of an edge-lighting type backlight of a liquid crystal display device 103 according to the third embodiment of the present invention. FIG. 3B is a cross-sectional view taken along line I-I of FIG. 3A.

The backlight 103 is provided under a liquid crystal panel 14 as shown in FIG. 3A. Then, the backlight 103 is equipped with a light guiding plate 9, which has an area corresponding to the surface area of a liquid crystal monitor and where irregular reflecting sections or diffused reflecting sections (not shown) are dispersedly provided on a rear surface, reflecting plates 10a, 10b provided on the rear surface and the side surface of the light guiding plate 9, a light source 11 provided on one side end portion of the light guiding plate 9, a reflecting plate 12 that reflects light from the light source 11 toward the light guiding plate 9, and a diffusing sheet 13 that diffuses reflected and transmitted light that is outputted from the surface of the light guiding plate 9.

The reflecting plates 10a, 10b provided on the rear surface and the side surface of the light guiding plate 9 were fabricated by processing the above-described light reflecting plate 101. Further, the reflecting plate 12 is also fabricated by processing the light reflecting plate 101.

In the backlight 103, light outputted from the light source 11 is reflected and transmitted inside the light guiding plate 9 while performing total reflection to make the light reach the entire light guiding plate 9. Then, acute-angled reflected light occurs by the irregular reflecting sections or the diffused reflecting sections dispersedly provided on the rear surface of the light guiding plate 9, and its reflected light is made incident to the surface of the light guiding plate 9 at a smaller incident angle than an incident angle that makes total reflection. The light is outputted from the surface of the light guiding plate 9 to the outside. Then, outputted light passes through the diffusing sheet 13 to generate diffused light, and the diffused light is used as backlight of the liquid crystal panel 14.

The reflecting plate 10a on the rear surface of the light guiding plate 9 returns light leaked from the rear surface of the light guiding plate 9 to the light guiding plate 9, and the reflecting plate 10b returns light leaked from the side surface of the light guiding plate 9 to the light guiding plate 9.

According to the edge-lighting type backlight 103 described above, the light reflecting plate 101 described in the first embodiment is used, and an edge-lighting type backlight having high reliability and high light reflectance due to no film peel can be provided inexpensively.

Further, by using the light reflecting plate described in the second embodiment, the edge-lighting type backlight can output light having the color of light directly from a light source.

Note that a liquid crystal display device equipped with the above-described edge-lighting type backlight is also included in the scope of the present invention. According to the liquid crystal display device, images to be displayed show natural color.

Further, a liquid crystal display device equipped with the light reflecting plate of this invention, which is provided under the liquid crystal panel, reflects external incident light and radiates it toward a liquid crystal, is also included in the scope of the present invention. According to the reflective liquid crystal display device, images to be displayed show natural color.

(iii) Illumination Fixture and Others

The light reflecting plate of the first embodiment can be used as the light reflecting plate of an illumination fixture such as a reflecting plate of light outputted from a fluorescent lamp or a mercury lamp, for example.

Since the light reflecting plate 101 described in the first embodiment is used in this illumination fixture, an illumination fixture having high reliability due to no film peel of the light reflecting plate 101 and high light reflectance can be provided inexpensively.

Moreover, by using the light reflecting plate described in the second embodiment, illumination light of an illumination fixture directly shows the color of the light from a light source.

In addition, optical devices such as a rear projection image display device, a scanner and a copier, which is equipped with the light reflecting plate of the first and the second embodiments are also included in the scope of the present invention.

INDUSTRIAL AVAILABILITY

Since the light reflecting plate of the present invention has high reliability due to no film peel, high light reflectance, and inexpensiveness, it is optimally used as a light reflecting plate of a mirror duct, an illumination fixture, an edge-lighting type backlight, a liquid crystal display device, a reflector for flash use of a digital camera, a freezer showcase or other optical devices. As the above-described illumination fixture, the invention is applicable to a light source using a fluorescent lamp or a mercury lamp, or a downlight.

What is claimed is:

1. A method for manufacturing a light reflecting plate, comprising the steps of:

forming a binder layer of an organic resin or an inorganic material on a metal plate;

forming a deposit of tin on a surface of the binder layer;

coating the surface of the binder layer with a solution of silver nitrate to displace the tin deposit with silver to form silver nuclei on the surface of the binder layer;

spray coating the surface of the binder layer with an aqueous solution containing silver nitrate and an aqueous solution containing a reducing agent for the silver nitrate to form a silver film as a reflecting layer on the binder layer.

2. The method for manufacturing a light reflecting plate according to claim 1, wherein:

the deposit of tin is formed by coating the binder layer with an aqueous solution of stannic chloride having a pH of 2 or less.

3. The method for manufacturing a light reflecting plate according to claim 2 wherein the aqueous solution containing silver nitrate has a pH of 10 to 13 and a temperature of 25° C.±5° C. and the aqueous solution containing the reducing agent has a pH of 8 to 12 and a temperature of 25° C.±5° C.

4. The method for manufacturing a light reflecting plate according to claim 1 wherein the aqueous solution containing silver nitrate has a pH of 10 to 13 and a temperature of 25° C.±5° C. and the aqueous solution containing the reducing agent has a pH of 8 to 12 and a temperature of 25° C.±5° C.

5. The method for manufacturing a light reflecting plate according to claim 3 wherein the reducing agent is hydrazine sulfate and the concentration of silver nitrate is 0.2 to 1 grams/liter to 1 gram per liter of hydrazine sulfate.

6. The method for manufacturing a light reflecting plate according to claim 1 wherein the reducing agent is hydrazine sulfate and the concentration of silver nitrate is 0.2 to 1 grams/liter to 1 gram per liter of hydrazine sulfate.

* * * * *

UNITED STATES PATENT AND TRADEMARK OFFICE
CERTIFICATE OF CORRECTION

| | | |
|---|---|---|
| PATENT NO. | : 8,064,014 B2 | Page 1 of 1 |
| APPLICATION NO. | : 12/585612 | |
| DATED | : November 22, 2011 | |
| INVENTOR(S) | : Teruyuki Tatsumi et al. | |

It is certified that error appears in the above-identified patent and that said Letters Patent is hereby corrected as shown below:

Title Page, Item (75) Inventors,

Please change the spelling of the first Inventor's name from "Teruy<u>a</u>ki, Tatsumi"

to --Teruy<u>u</u>ki, Tatsumi--.

Signed and Sealed this
Twenty-first Day of February, 2012

David J. Kappos
*Director of the United States Patent and Trademark Office*